(12) United States Patent
Vergara

(10) Patent No.: US 11,403,145 B1
(45) Date of Patent: Aug. 2, 2022

(54) ENFORCING SYSTEM CONFIGURATION FREEZE OF SERVICES DEPLOYED VIA CONTINUOUS DELIVERY ON DATACENTERS CONFIGURED IN CLOUD PLATFORMS

(71) Applicant: salesforce.com, inc., San Francisco, CA (US)

(72) Inventor: Jeaneth Vergara, Granite Bay, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/147,715

(22) Filed: Jan. 13, 2021

(51) Int. Cl.
| | |
|---|---|
| G06F 9/455 | (2018.01) |
| G06F 9/46 | (2006.01) |
| G06F 9/50 | (2006.01) |
| G06F 9/38 | (2018.01) |
| G06F 9/48 | (2006.01) |
| G06F 8/656 | (2018.01) |
| G06F 9/52 | (2006.01) |

(52) U.S. Cl.
CPC ............ G06F 9/5072 (2013.01); G06F 8/656 (2018.02); G06F 9/3869 (2013.01); G06F 9/4887 (2013.01); G06F 9/526 (2013.01); G06F 2209/5013 (2013.01)

(58) Field of Classification Search
CPC .... G06F 9/5072; G06F 9/3869; G06F 9/4887; G06F 9/526; G06F 8/656; G06F 2209/5013

USPC ......................................................... 718/102
See application file for complete search history.

(56) References Cited

U.S. PATENT DOCUMENTS

| | | | |
|---|---|---|---|
| 11,163,673 B1* | 11/2021 | Meier | ................ G06F 11/3466 |
| 2019/0129701 A1 | 5/2019 | Hawrylo et al. | |
| 2020/0104107 A1 | 4/2020 | Hodder et al. | |
| 2020/0110598 A1 | 4/2020 | Liu et al. | |
| 2020/0356403 A1 | 11/2020 | Kasha et al. | |

OTHER PUBLICATIONS

Burns, E. et al., "Continuous Delivery with Spinnaker," O'Reilly Media, May 11, 2018, XP055626768, pp. 1-81.
PCT International Search Report and Written Opinion, PCT Application No. PCT/US2021/015827, dated Nov. 5, 2021, 21 pages.

(Continued)

*Primary Examiner* — Bradley A Teets
(74) *Attorney, Agent, or Firm* — Fenwick & West LLP

(57) ABSTRACT

Computing systems, for example, multi-tenant systems deploy software artifacts in data centers created in a cloud platform using a cloud platform infrastructure language that is cloud platform independent. The system allows users to specify a system configuration freeze for a time interval for services running in a datacenter configured on a cloud platform. During the system freeze, changes to the system are prohibited or put on hold. The system generates pipelines for modifying system configuration of services. A pipeline includes a change stage for making a change associated with a service and a pre-change stage for acquiring a lock. If the system receives a request for performing system freeze of a datacenter entity, the system acquires locks on services of the datacenter entity. As a result, execution of pipelines configured to change the system configuration of the services is put on hold.

20 Claims, 16 Drawing Sheets

(56) References Cited

OTHER PUBLICATIONS

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.

Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

\* cited by examiner

ENFORCING SYSTEM CONFIGURATION FREEZE OF SERVICES DEPLOYED VIA CONTINUOUS DELIVERY ON DATACENTERS CONFIGURED IN CLOUD PLATFORMS

BACKGROUND

Field of Art

This disclosure relates in general to management of software releases in cloud computing platforms and enforcing a system configuration freeze of services deployed via continuous delivery on data centers configured in cloud computing platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Organizations are shifting their services to cloud platforms that provide scalability and elasticity of computing resources.

Organizations maintain cloud infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. Continuous delivery platforms make it easier for developers to make changes to software artifacts that affect the services running on the system and deploy the updated software artifacts. However, there are time periods when any changes to services running on the system are not desirable. The organization providing the system may prefer to impose a system freeze (also referred to as a feature freeze or a computing moratorium) for such time periods. For example, if the system is expecting particularly high traffic. Modifying the software artifacts associated with a service may decrease the stability of the system since unforeseen situations such as software defects or software bugs are likely to be encountered as a result of the changes.

A large system such as a multi-tenant system may manage services for a large number of organizations representing tenants of the multi-tenant system and may interact with multiple cloud platforms. A multi-tenant system may have to maintain several thousand tenants across multiple cloud platforms. Furthermore, the software, languages, features supported by each cloud platform may be different. As a result, tracking changes made to services deployed on datacenter configured on cloud platforms is cumbersome and error prone process. As a result, there is high likelihood that a developer may change a software artifact associated with a service deployed in an online system even though there is a computing moratorium on the service, thereby decreasing the stability of the system.

Figure 1:
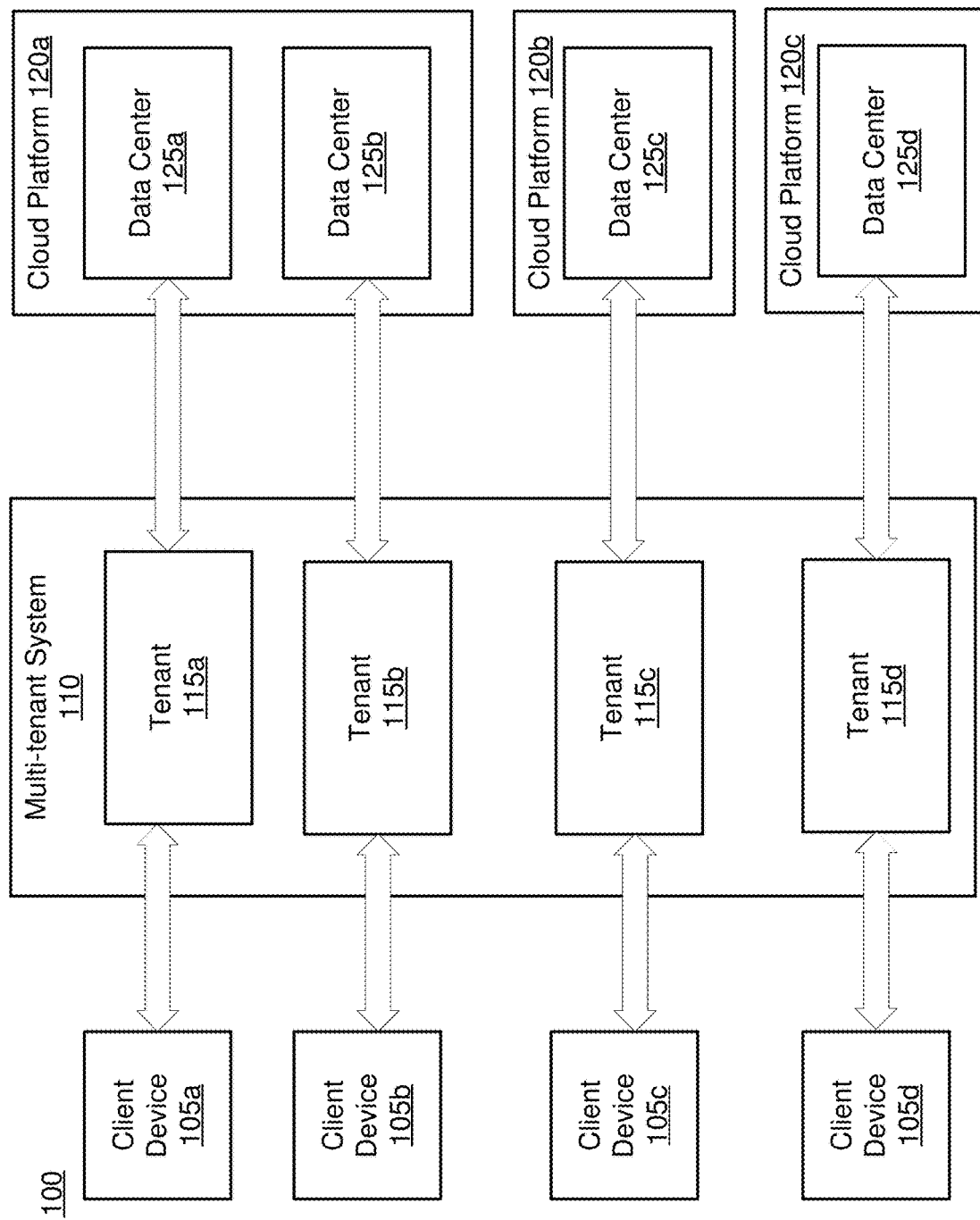
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

The system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of datacenter defined by the declarative specification. The system executes the cloud platform dependent detailed pipeline on the target cloud platform, for example, to deploy software releases on datacenter entities of the datacenter.

The system allows users to specify a system freeze (also referred to as a computing moratorium) for a time interval for services running in a datacenter configured on a cloud platform. During the system freeze, changes to the system are prohibited or put on hold. The changes that can be prevented during a system freeze include upgrades to software artifacts, changes to configurations of resources used by the system (for example, infrastructure resource such as load balancers, databases, servers, firewalls, network resources, and so on), data center configuration changes, modifications to libraries and other system artifacts used by the system, modifications to applications, and so on. Although the online system may use a continuous delivery platform for allowing developers to modify source code used in software artifacts, the embodiments disclosed herein allow the organization to put any such changes on hold during a particular time interval.

As an example, an organization providing services via an online system may determine that during high traffic periods, the services running on the online system should not be disturbed. Accordingly, embodiments allow the system to be frozen such that the system continues to run and no changes can be made to the system. This reduces the likelihood of encountering a system downtime.

As another example, the system may have some issue that needs a team to analyze the system to determine the cause of the issue. However, during the time period that the system is being analyzed for determining the cause of a particular issue, a system administrator may prefer to freeze the services of the system such that no changes can be made to software artifacts while the system is being monitored and debugged. This helps isolate the issue modifications to the system while the system is being monitored and debugged make it difficult to determine whether the issue was caused by the original software of the services or by any changes that were made to the software while the issue was being debugged.

As another example, there may be multiple subsystems running within a system. The embodiments disclosed allow the subsystems to be modified in a mutually exclusive manner such that only one subsystem (or a small set of subsystems) is modified at a time. A particular subsystem may be modified at a time by deploying software artifacts for that subsystem. A system administrator may prefer to impose a moratorium on the remaining subsystems so that only one subsystem is modified at a time. The moratorium is lifted once the subsystem is deployed and tested to ensure that the subsystem is running reliably before allowing other subsystems to proceed with making changes to their respective software artifacts. Embodiments allow such moratoriums to be imposed on the systems, thereby selectively preventing modifications to software artifacts deployed in the system.

A cloud platform is also referred to herein as a substrate. The system may represent a multi-tenant system but is not limited to multi-tenant systems and can be any online system or any computing system with network access to the cloud platform.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
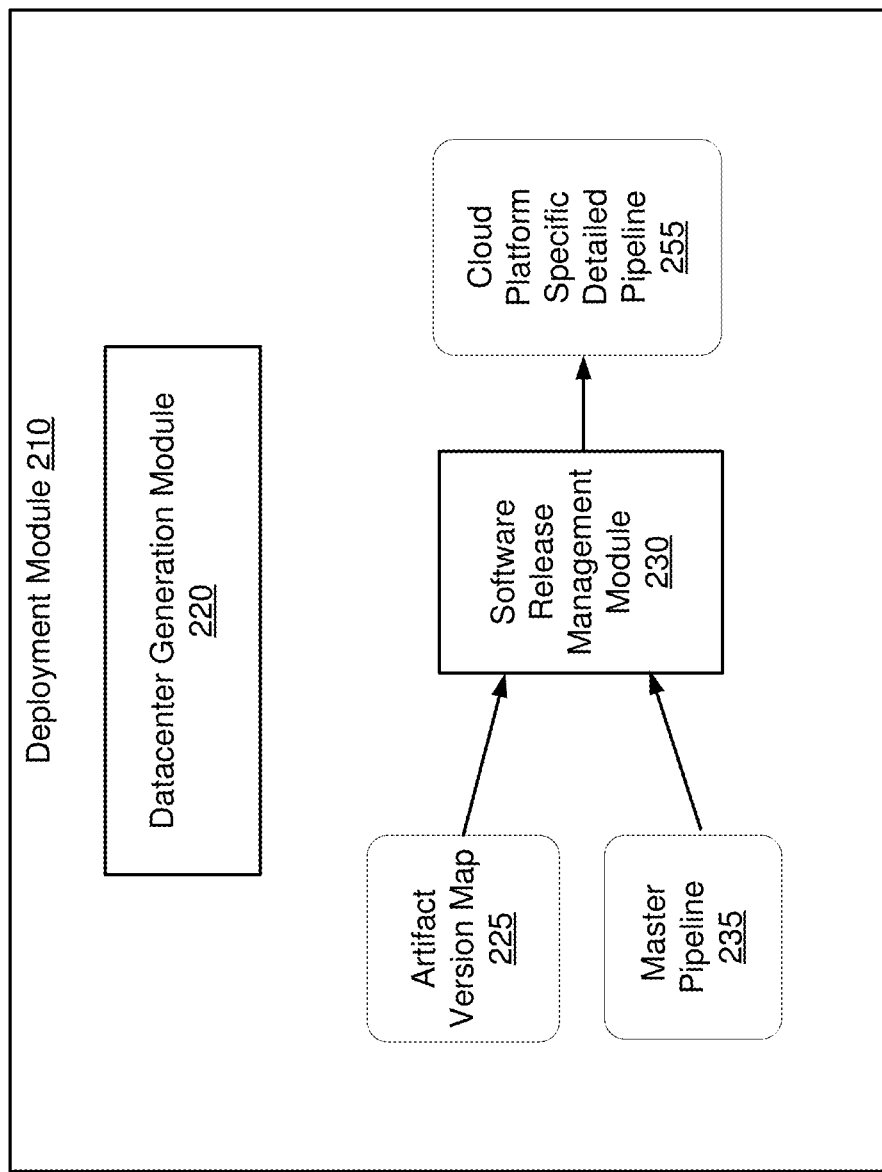
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating datacenters on the cloud platform. The software release management module 230 includes instructions for deploying software releases or software artifacts for various services or applications running on the datacenters created by the data center generation module 220.

Figure 4:
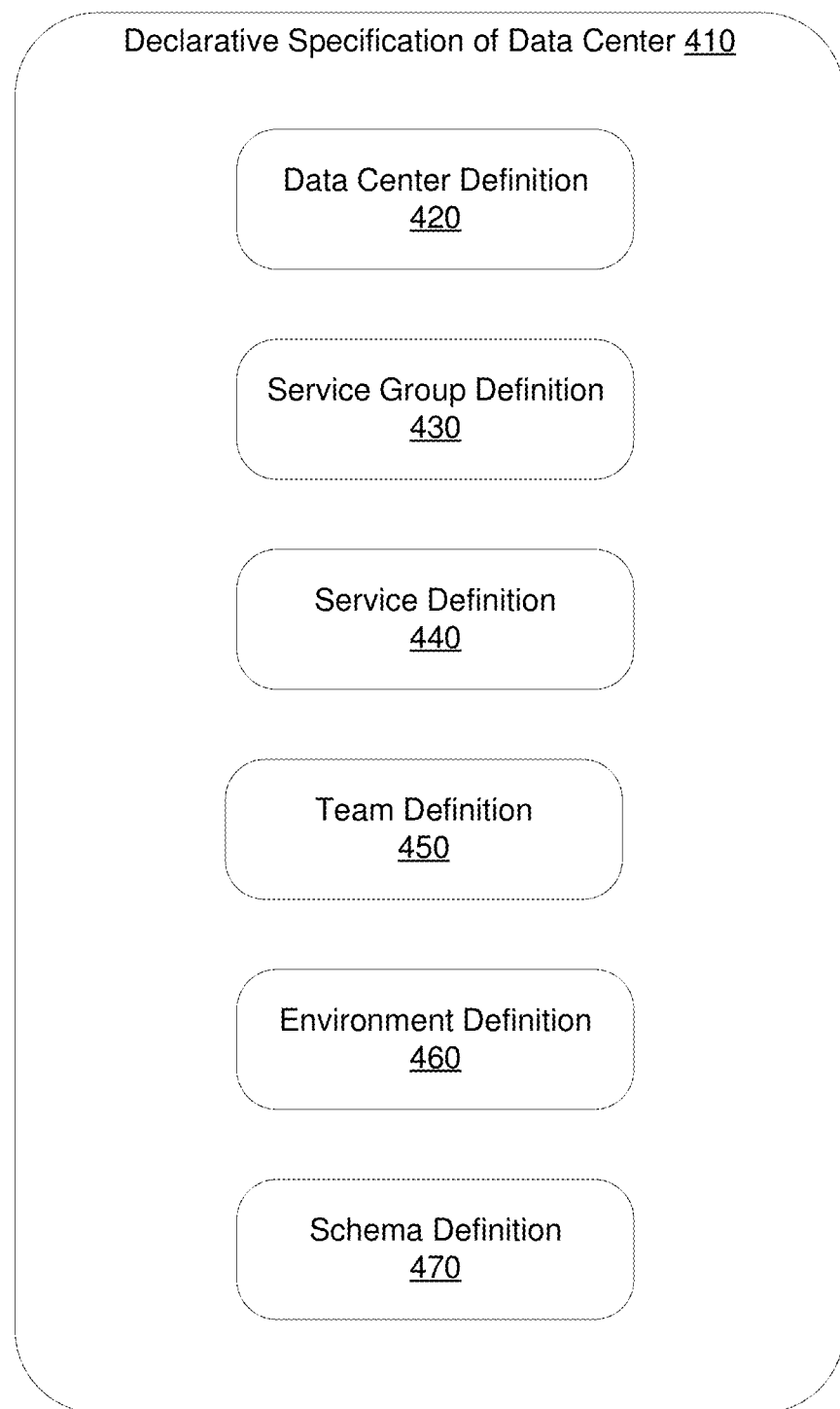
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific datacenter entities. The artifact version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
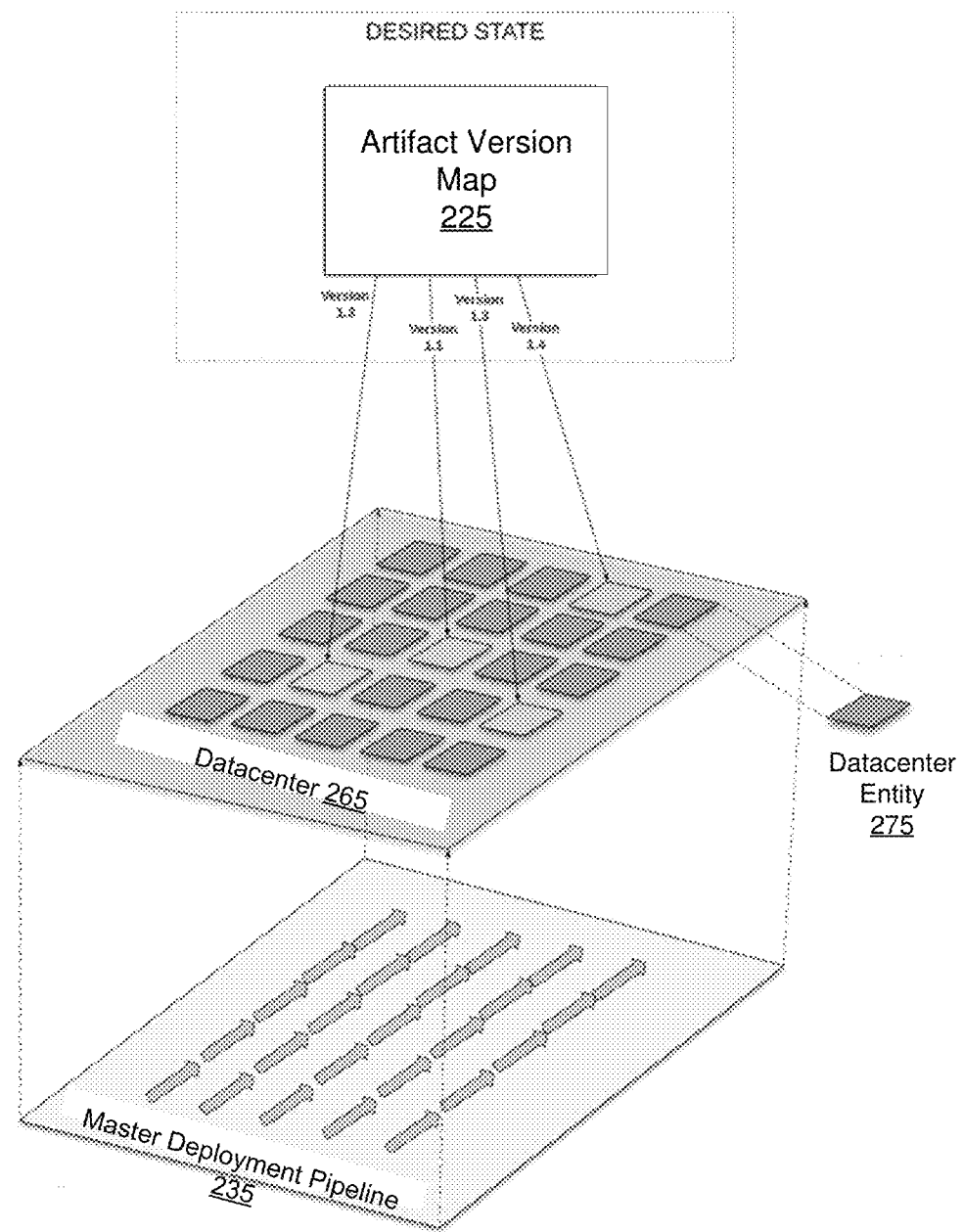
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the artifact version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the artifact version map 225 to determine cloud platform specific detailed pipeline 255 that maps the appropriate version of software artifacts on the datacenter entities according to the artifact version map 225.

Figure 3:
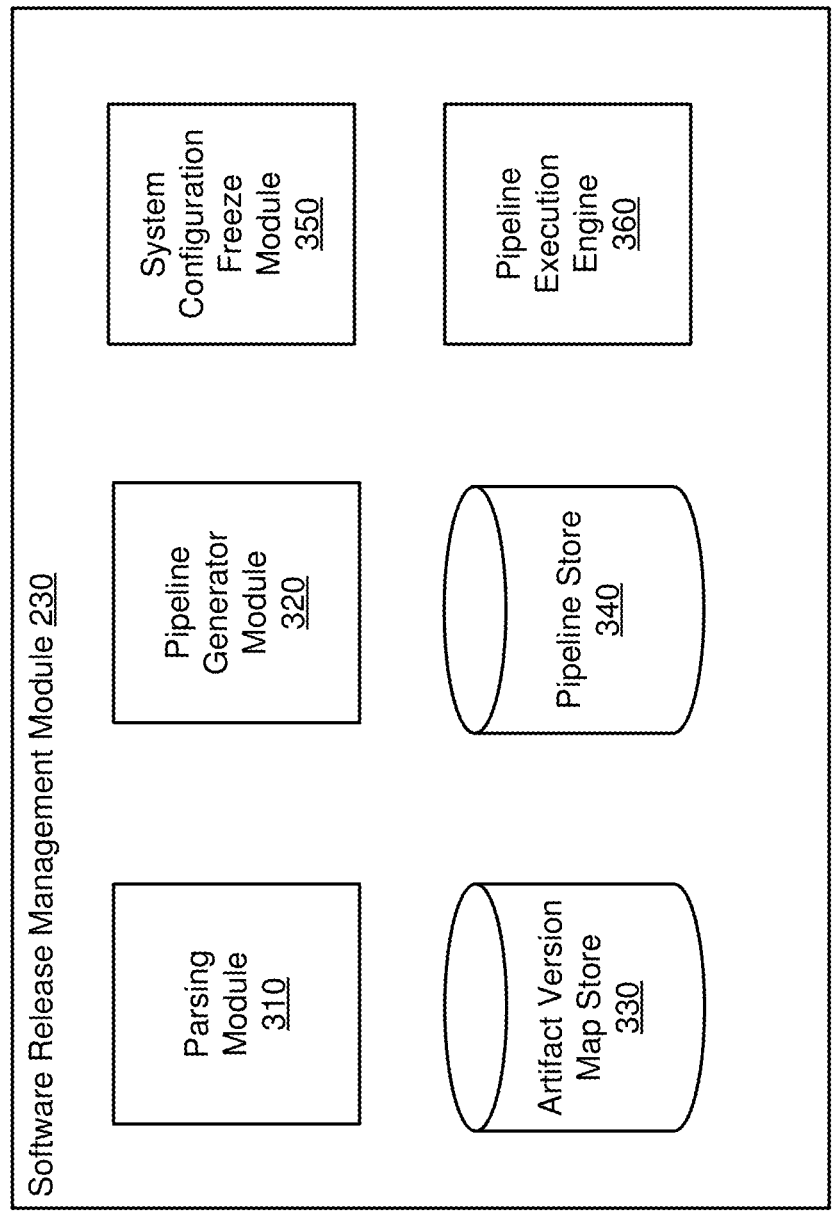
FIG. 3 is a block diagram illustrating the architecture of a software release management module 230 according to one embodiment.

FIG. 3 is a block diagram illustrating the architecture of a software release management module 230 according to one embodiment. The software release management module 230 includes a parsing module 310, a pipeline generator module 320, an artifact version map store 330, a pipeline store 340, a system configuration freeze module 350, and a pipeline execution engine 360. Other embodiments may include more, fewer, or different modules than those indicated herein in FIG. 3.

The various modules shown in FIG. 3 may run on different systems in a distributed fashion. For example, the pipeline generator module 320 may execute on a computing system of a multi-tenant system whereas the pipeline execution engine 360 may execute on a computing system of a cloud platform on which the datacenter entities and services are being deployed.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map.

The artifact version map store 330 stores artifact version maps received from users and the pipeline store 340 stores master pipelines as well as pipelines generated by the pipeline generator module 320.

The system configuration freeze module 350 receives and processes requests to perform system configuration freeze of services running in a datacenter entity of a datacenter configured on a cloud platform. The request received specifies one or more services or a datacenter entity configured on the cloud platform and a time interval during which the system configuration freeze is requested to be performed for the services or datacenter entities. Further details of the system configuration freeze module 350 are provided in connection with FIG. 11. Various processes executed by the system configuration freeze module 350 are described herein.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform. The pipeline execution engine 360 may execute on one or more computing systems of the cloud platform.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
"service_group": [
    {
     "cells": [ ],
     "description": "Service group Service Instance Definitions",
     "service_group_id": "id1",
     "name": "name1",
     "schema_version": "1.0",
```
-continued

```
     "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
        {
          "cluster_instance_name": " cluster3",
          "cluster_type": " cluster_type2"
        }
     ],
     "service_instances": [
        {
          "service_instance_name": "serviceinstance0001",
          "service_type": "servicetype1"
        },
        {
          "service_instance_name": "serviceinstance0002",
          "service_type": " servicetype1"
          "cluster_instance": "cluster1"
        },
        {
          "service_instance_name": "serviceinstance0003",
          "service_type": " servicetype2"
        },
        ...
     ],
     "service_teams": ["team1"],
     "type": "servicetype"
     "security_groups":[
        {
          "name":"group1",
          "policies":[
             {
               "description":"Allow access from site S1",
               "destination":{ "groups":[ "group2" ] },
               "environments":[ "dev", "test", "staging" ],
               "source":{
                  "iplist":"URL1",
                  "filters":[ filter-expression ]
               }
             }
          ]
        }
     ]
    }
]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized_clients": [ ],
      "build_dependencies": [ ],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ...],
      "sub_services": [ "service1", "service2", " service3", ... ],
      "listening_ports":[
          { "protocol":"tcp", "ports":[ "53" ] },
          { "protocol":"udp","ports":[ "53" ] }
        "outbound_access":[
          {
            "destination":[
              {
                "endpoints":[ ".xyz.com:443", ".pqr.com:443" ]
              }
            ]
          }
        ],
    }
  ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com",
    }
  ],
  "communication_channel": "channel1"
  "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
    "datacenter_instance_identifier": "id1",
    "name": "data_center1",
    "region": "region1",
    "service_groups": [
      "service_group1",
      " service_group2",
      " service_group3",
      "service_group4",
      ...
    ],
    "schema_version": "1.0",
    "admin_team":"admins",
    ...
  }
}
```

Figure 5:
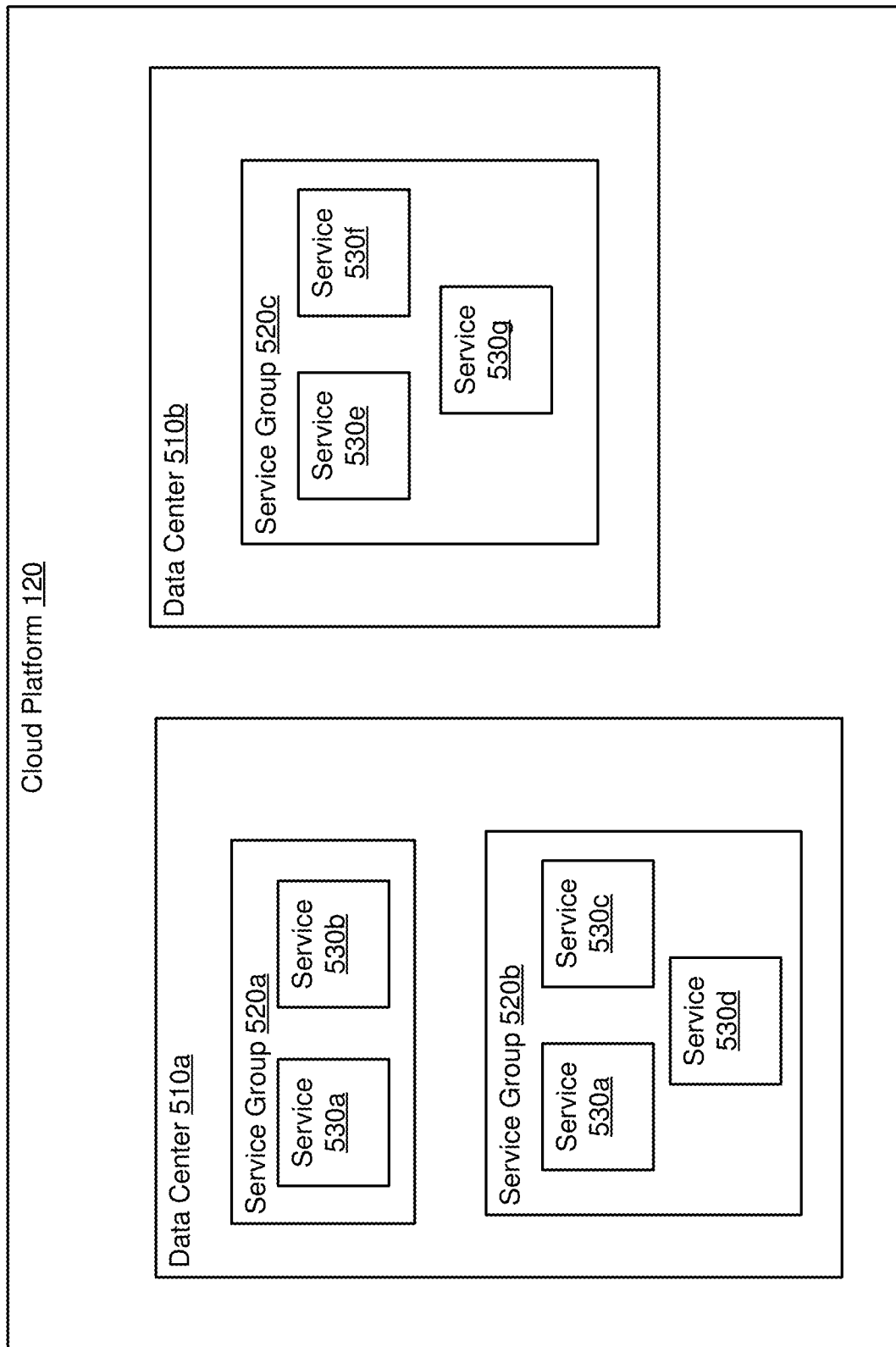
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

The datacenter generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
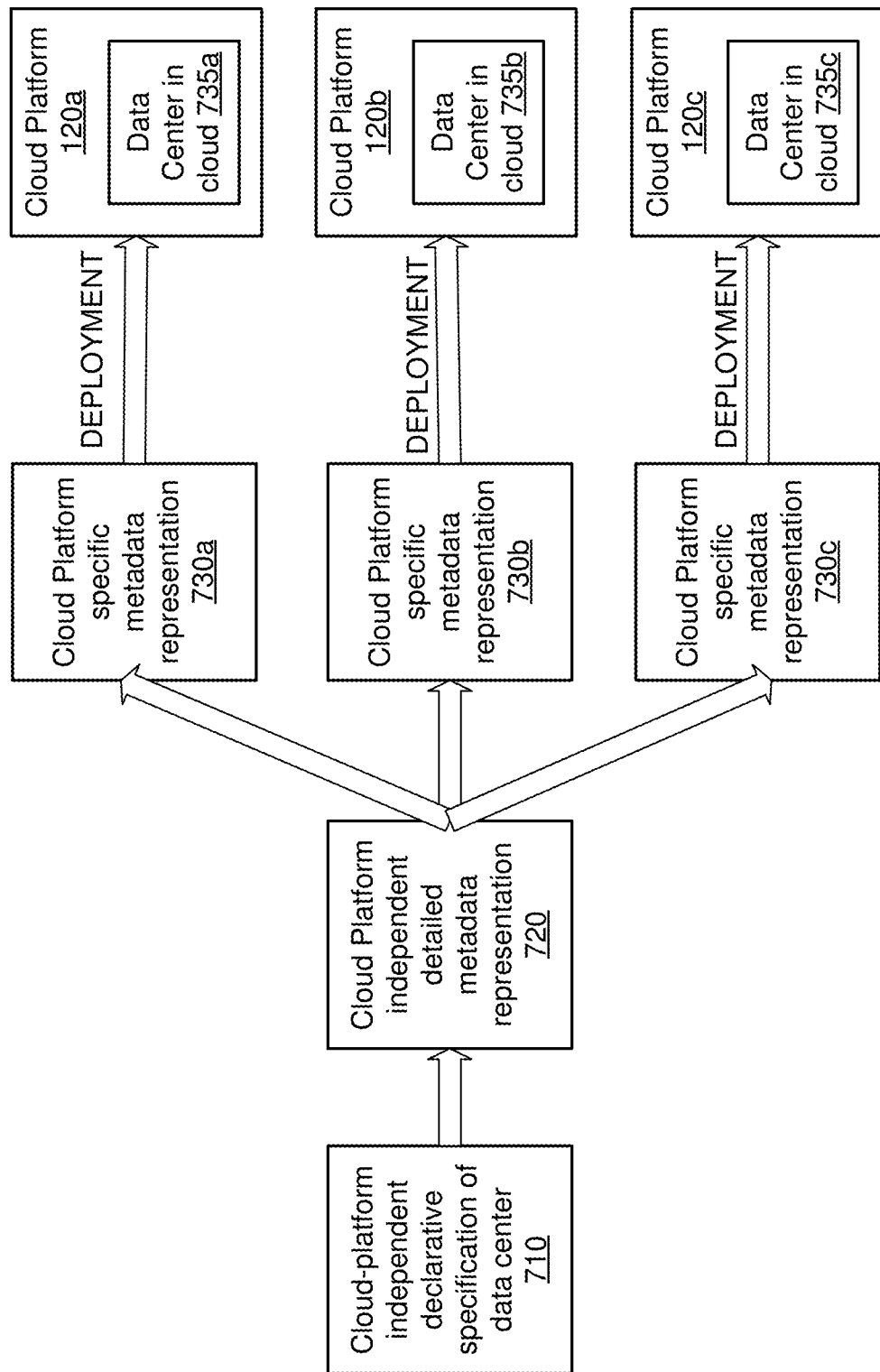
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Datacenter

Figure 7:
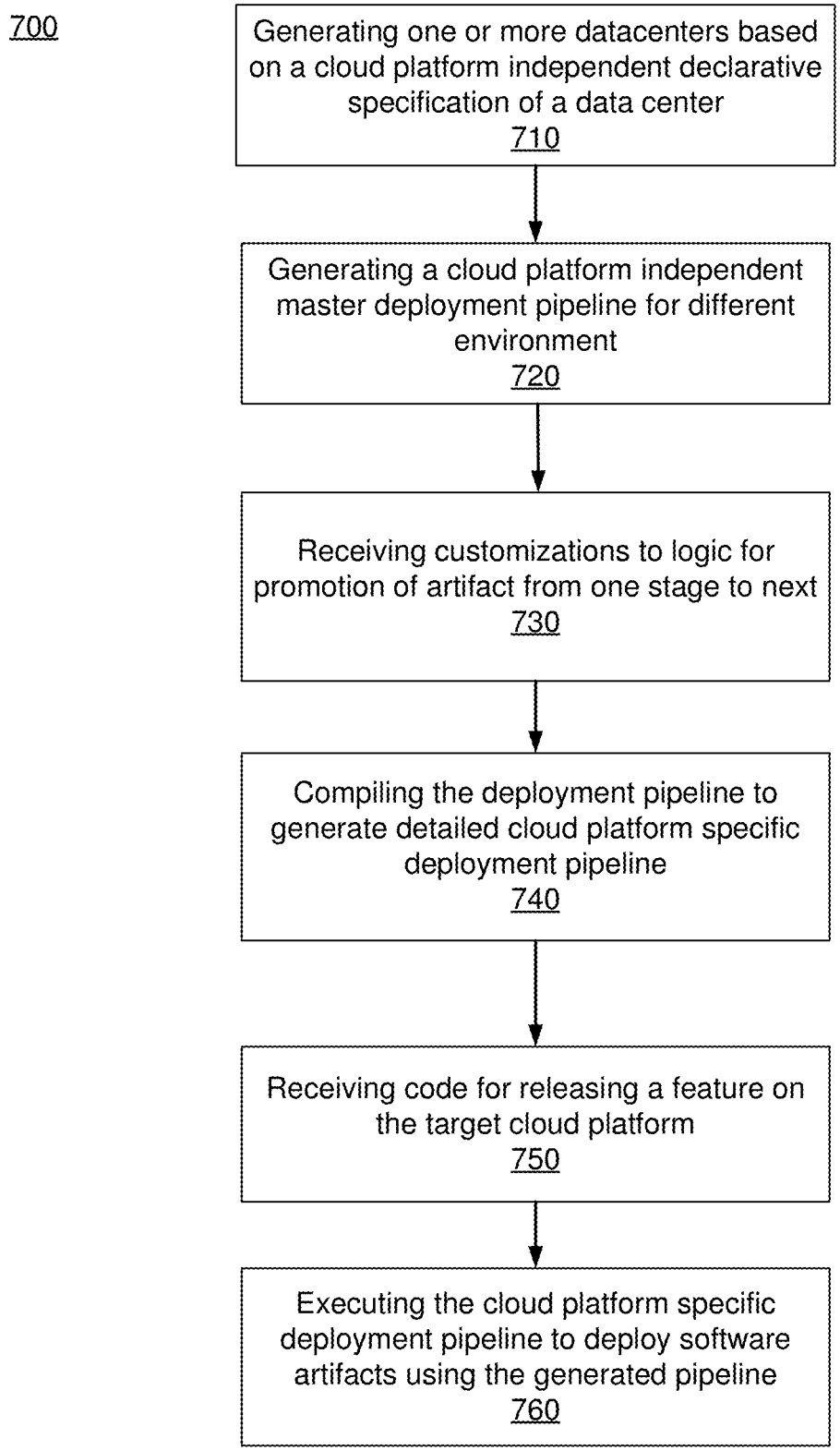
FIG. 7 shows the overall process for generating pipelines for deployment of software artifacts on datacenters configured on a cloud platform according to an embodiment.

FIG. 7 shows the overall process for generating pipelines for deployment of software artifacts on datacenters configured on a cloud platform according to an embodiment. The datacenter generation module generates 710 one or more datacenters on a target cloud platform. Each datacenter is generated from a cloud platform independent declarative specification and has a hierarchy of datacenter entities.

The software release management module 230 generates 720 a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what threshold is The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives 750 code for releasing one or more features of services deployed on the datacenter. The software release management module 230 executes 760 the cloud platform specific detailed deployment pipeline to deploy software artifacts based on the received code.

Figure 8:
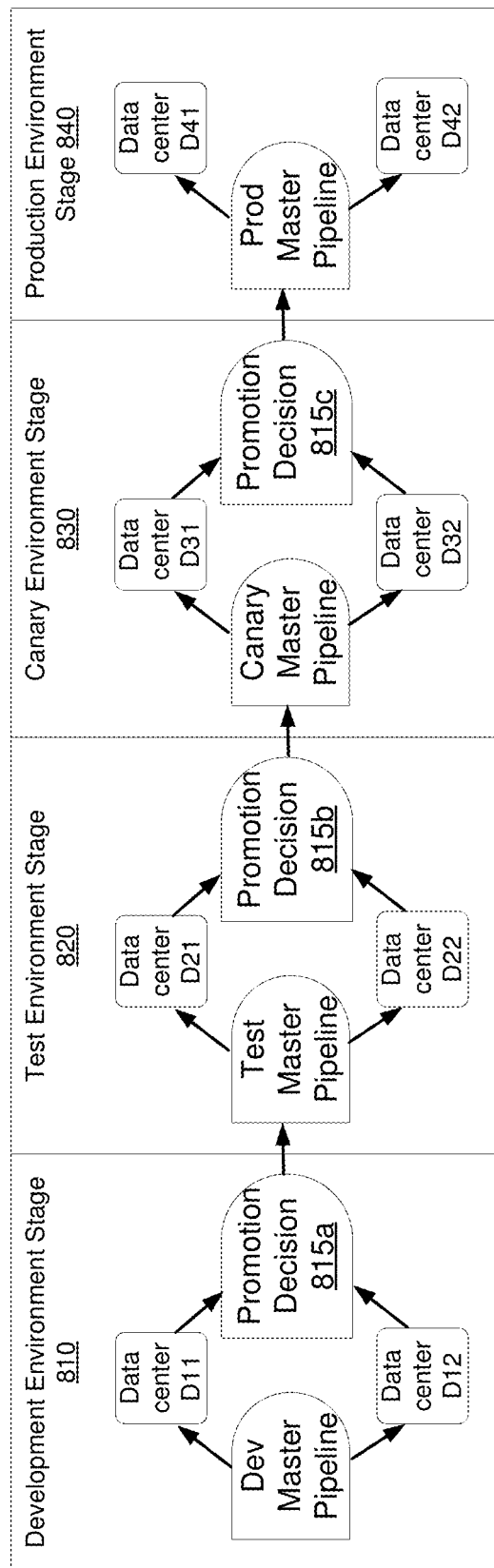
FIG. 8 illustrates an example master pipeline according to an embodiment.

FIG. 8 illustrates an example master pipeline 800 according to an embodiment. A master pipeline represents a sequence of stages that represent progressive conditional deployment across various datacenter environments. FIG. 8 shows stages for different environments of datacenter including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into datacenter pipelines D11, D12, . . . , depending on the number of datacenters specified as having development environment in the declarative specification of the datacenters.

The test environment pipeline 820 comprises a test master pipeline that feeds into datacenter pipelines D21, D22, . . . , depending on the number of datacenters specified as having test environment in the declarative specification of the datacenters.

The canary environment pipeline 820 comprises a canary master pipeline that feeds into datacenter pipelines D31, D32, . . . , depending on the number of datacenters specified as having canary environment in the declarative specification of the datacenters.

The production environment pipeline 820 comprises a production master pipeline that feeds into datacenter pipelines D21, D22, . . . , depending on the number of datacenters specified as having test environment in the declarative specification of the datacenters.

Each environment pipeline 810, 820, 830 includes a promotion decision pipeline 815*a*, 815*b*, 815*c* respectively. The outputs of the datacenter pipelines of the environment pipeline are collected by the promotion decision pipeline 815 that determines whether the software artifact is ready for promotion to the next stage. The promotion decision pipeline 815 may determine based on test case results obtained by the datacenters whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815*a* of development environment pipeline determines whether to promote the software artifact from development stage to test stage; the promotion decision pipeline 815*b* of test environment pipeline determines whether to promote the software artifact from test stage to canary stage, and the promotion decision pipeline 815*c* of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
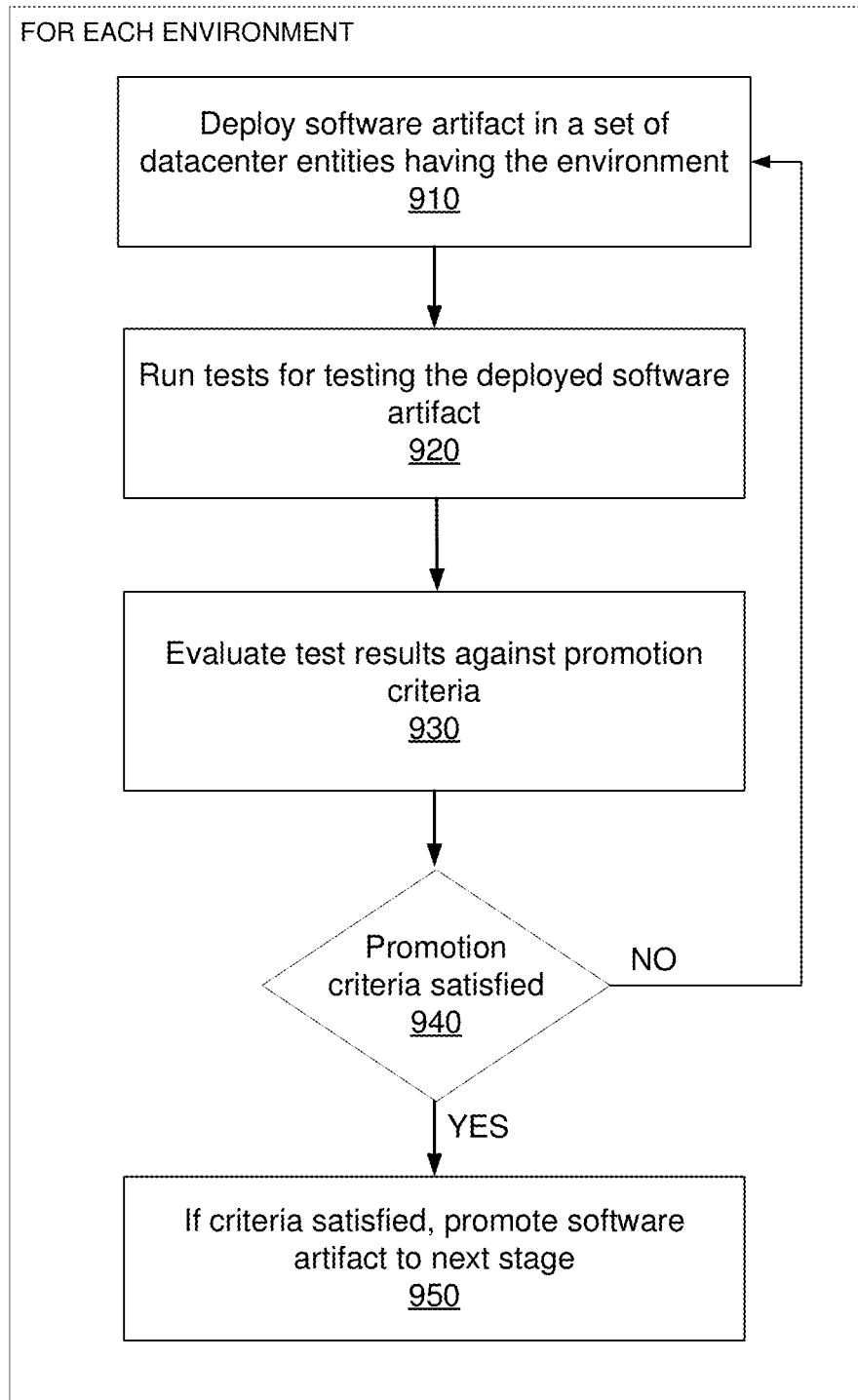
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of datacenter entities, for example, a set of datacenter entities specified as having the environment E. In an embodiment, the software artifact is generated by compiling source code for a service. The source code may be obtained from a version control software. The set of datacenter entities may include datacenter instances, service groups, cells, services, or any combination of these.

The environment pipeline for the environment E further includes instructions for running 920 tests for testing the deployed software artifact on the set of datacenter entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
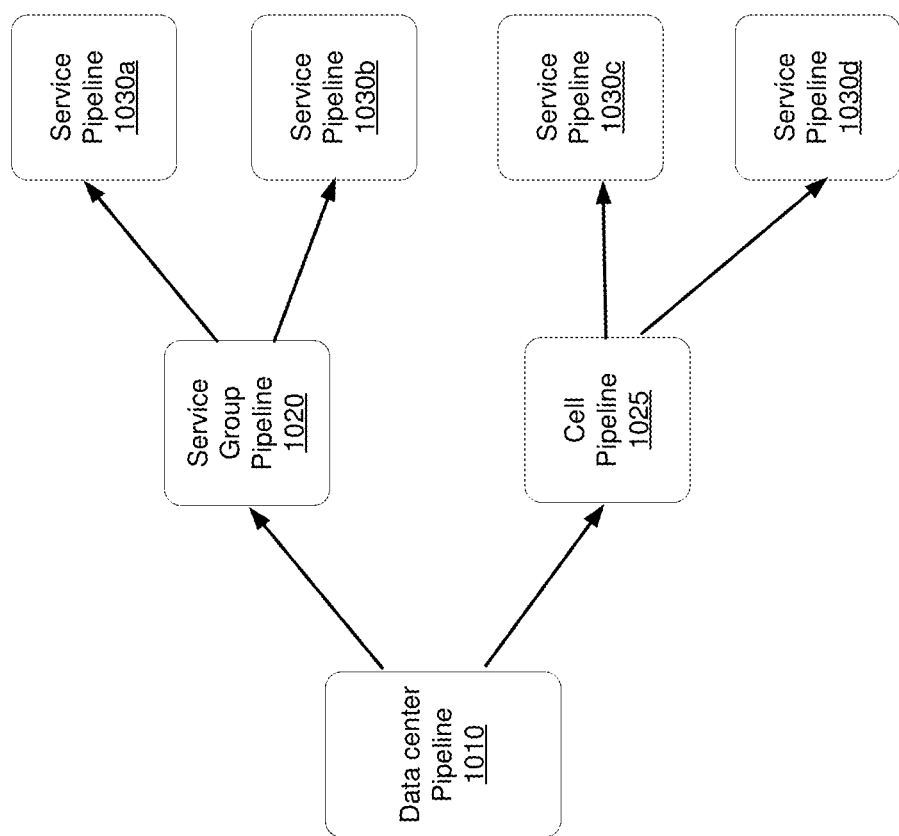
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities. A datacenter instance pipeline 1010 may include service group pipelines 1020. Each service group pipeline 1020 may include one or more service pipelines 1030. A datacenter instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The datacenter generation module 220 receives a cloud platform independent declarative specifications for one or more datacenters. The datacenter generation module 220 generates (or configures) datacenters according to the received cloud platform independent declarative specifications. The deployment module 210 receives promotion decision 815 pipelines. The promotion decision 815 pipelines are integrated into the overall master pipeline.

The pipeline generator creates all pipelines for each datacenter from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates datacenter instance master pipelines to invoke service group pipelines; the pipeline generator generates a service master pipeline to invoke the datacenter instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
 "stages": [
  {
   "stage_name": "Artifact version map for service SVC",
   "stage_type": "version_map",
   "prior_stage_ids": [ ]
  },
  {
   "pipeline_type": "env-type-aggregate",
   "template_name": "deploy_dev.j2",
   "stage_name": "Deploy to dev env",
   "stage_type": "master_deployment_pipeline",
   "prior_stage_ids": [  " Artifact version map for service SVC"   ]
  },
  {
   "promote_to": "test",
   "template_name": "promote.j2",
   "pipeline_type": "promotion",
   "stage_name": "Promote to test env",
   "stage_type": "promotion",
   "prior_stage_ids": [   "Deploy to dev env"   ]
  },
  {
   "pipeline_type": "env-type-aggregate",
   "template_name": "deploy_test.j2",
   "stage_name": "Deploy to test env",
   "stage_type": "master_deployment_pipeline",
   "prior_stage_ids": [   "Promote to test env"   ]
  },
  {
   "promote_to": "stage",
   "template_name": "promote.j2",
   "pipeline_type": "promotion",
   "stage_name": "Promote to staging env",
   "stage_type": "promotion",
   "prior_stage_ids": [   "Deploy to test env"   ]
  },
  {
   "promote_to": "stage",
   "template_name": "promote.j2",
   "pipeline_type": "promotion",
   "stage_name": "Promote to staging env",
   "stage_type": "promotion",
   "prior_stage_ids": [   "Deploy to test env"   ]
  } ...
```

As shown in the examiner master pipeline, the first stage is an artifact version map. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Software Artifact Version Map

In an embodiment, the deployment module 210 receives an artifact version map that associates various software artifacts and their versions with datacenter entities. The artifact version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The artifact version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the artifact version map.

In an embodiment, the artifact version map is specified as a JSON (Javascript object notation) file, a YAML file, or a file using any other syntax for representing nested objects. The artifact version map may comprise a set of <service>:<version> key pairs that are associated with various datacenter entities distributed across a hierarchy of a datacenter. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
  "name": "artifact_version_map1",
  "schema_version": "0.1",
  "release_label": "release1.1",
  "deployments": {
    "env_types": [
      {
        "name": "development",
        "datacenter_instances": [
          {
            "name": "datacenter1",
            "service_group": [
              {
                "name": "service_group1",
                "services": [
                  {
                    "service_instance": "instance001",
                    "name": "service1",
```

-continued

```
                    "versions": [
                      {
                        "software_artifact_name": "library1",
                        "version": "version1"
                      }
                    ]
                  }
                ]
              }
            ]
          }
        ]
      }
    ],
  }
}
```

In an embodiment, the artifact version map specifies a datacenter entity using a full path of the datacenter entity, for example, "stagger_group1/datacenter1/service_group2/service1". In an embodiment, the artifact version map specifies a set of datacenter entities using regular expressions in the full path of the datacenter entity. For example, a full path that includes service_group[?] includes service_group1, service_group2, service_group3, and so on.

Following is an example of an artifact version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app1 will be deployed.

```
env_types:
  - name: "dev|test"
    datacenter_instances:
      - name: "(.*)"
        service_group:
          - name: "(.*)"
            services:
              - service_instance: "service*"
                name: "app1"
                versions:
                  version: "V1"
```

In some embodiments, the artifact version map may specify parameters used by pipelines. Accordingly, the specified parameters will be applicable to a stagger group for which the parameter is specified.

The following process is used for deployment of software artifacts on datacenters configured on a cloud platform according to an embodiment. The datacenter generation module generates one or more datacenters on a target cloud platform. Each datacenter is generated from a cloud platform independent declarative specification and has a hierarchy of datacenter entities.

The software release management module 230 receives as input, an artifact version map that maps datacenter entities to versions of software artifacts. The software release management module 230 also receives as input, a cloud platform independent master pipeline.

The software release management module 230 compiles the cloud platform independent master pipeline in conjunction with the artifact version map to generate a cloud platform specific detailed pipeline. In an embodiment, the generated cloud platform specific detailed pipeline includes artifact version map filters before certain stages to determine whether certain stages should be enabled or disabled according to the artifact version map.

The software release management module 230 further receives code for releasing one or more features of services deployed on the datacenter. For example, the code may represent source code obtained from a version control management system storing source code repositories to which changes are submitted by developers. The software release management module 230 executes the cloud platform specific deployment pipeline to deploy software artifacts based on the received code.

The artifact version map and master pipelines can be used to orchestrate various types of operations related to continuous delivery of software artifacts in a cloud-based datacenter. The artifact version map and the master pipelines can be configured to perform aggregate retry operations for a service or a service group or any datacenter entity. The artifact version map includes configurations of retry operations for a datacenter entity, including the retry strategy, a threshold number of retries to perform in case of failure to execute a stage of a pipeline, whether confirmation from a user is required before retrying or retry is performed automatically, and so on. For example, a retry strategy may be a fixed backoff strategy that pauses execution for a fixed period of time before retrying. Other retry strategies may be configured using artifact version map and master pipelines. In an embodiment, the pipeline generator introduces an invoke retrier stage within an aggregate pipeline to trigger a retry strategy if a previous pipeline stage fails. The retry strategy and configuration parameters specified for a datacenter entity applies to all datacenter entities and services within the datacenter entity unless the value is overridden for a nested datacenter entity.

System Configuration Freeze of Services

In an embodiment, the system configuration freeze module 350 performs system configuration freeze on services deployed in a target cloud platform. The system configuration freeze may be performed in response to a request received from a user, for example, a system administrator. The request may identify a datacenter entity and request a system configuration freeze of all services running on the datacenter entity. The system configuration freeze ensures that no system configuration changes are made to services of the datacenter entity and no modifications are made to software artifacts associated with services running on the datacenter entity.

In an embodiment, the system receives a request to set a system configuration freeze for a datacenter entity, for example, a service group, a cell, a datacenter, and so on. The system determines the services that are within the datacenter entity, for example, based on the declarative specification of the datacenter or based on metadata describing the topological hierarchy of the datacenter. For example, the system performs a hierarchical traversal of all datacenter entities that are below the datacenter entity and identifies all services within the datacenter entity. The system performs system configuration freeze on all the services identified within a datacenter entity D1 unless the system receives a request to create an exception (i.e., override) for a particular service S1 or for a smaller datacenter entity D2 within the identified datacenter entity D1 to not perform the system configuration freeze for the service S1 or for the smaller datacenter entity D2.

The system configuration freeze may be performed responsive to determining that greater than a threshold amount of workload is expected during the time interval. For example, if a tenant of a multi-tenant system expects a large number of requests for processing during a time interval such as holidays, the tenant may request the services running on a production system to be frozen during the time interval to avoid a possibility of disruption of services.

In an embodiment, the system may receive a modified declarative specification along with a request for perform a system configuration freeze on the datacenter entity. For example, a datacenter may get modified to add a datacenter entity D2 within the hierarchy of datacenter entity D1 or add a service s1 within the hierarchy of datacenter entity D1. The system creates the requested datacenter entity D2 or the service S1 and enforces the system configuration freeze for the created service or datacenter entity during a specified time interval.

The system configuration freeze may be performed responsive to determining that an issue associated with the datacenter entity is being diagnosed during the time interval. For example, a tenant of a multi-tenant system may identify an issue with a datacenter entity or a service such as a performance issue causing the service to perform poorly. System administrators of the tenant may run diagnostic processes and tools to identify the root cause of the issue. While the issue if being diagnosed, the tenant may prefer to freeze the system configuration of the datacenter entity or the service to minimize changes to the system so as to be able to accurately diagnose the problem.

The system configuration freeze may be performed responsive to determining that a particular system configuration change is being performed during the time interval. The system configuration freeze prevents any other system configuration change during the time interval. Accordingly, the system can ensure that changes to the system configuration that may interfere with each other are performed in a mutually exclusive manner so that only on change is performed at a time and any other changes are blocked during that period.

Although examples described herein illustrate the processes in the context of multi-tenant systems, the techniques disclosed can be applied to any other system, for example, a system dedicated to a single organization.

Figure 11:
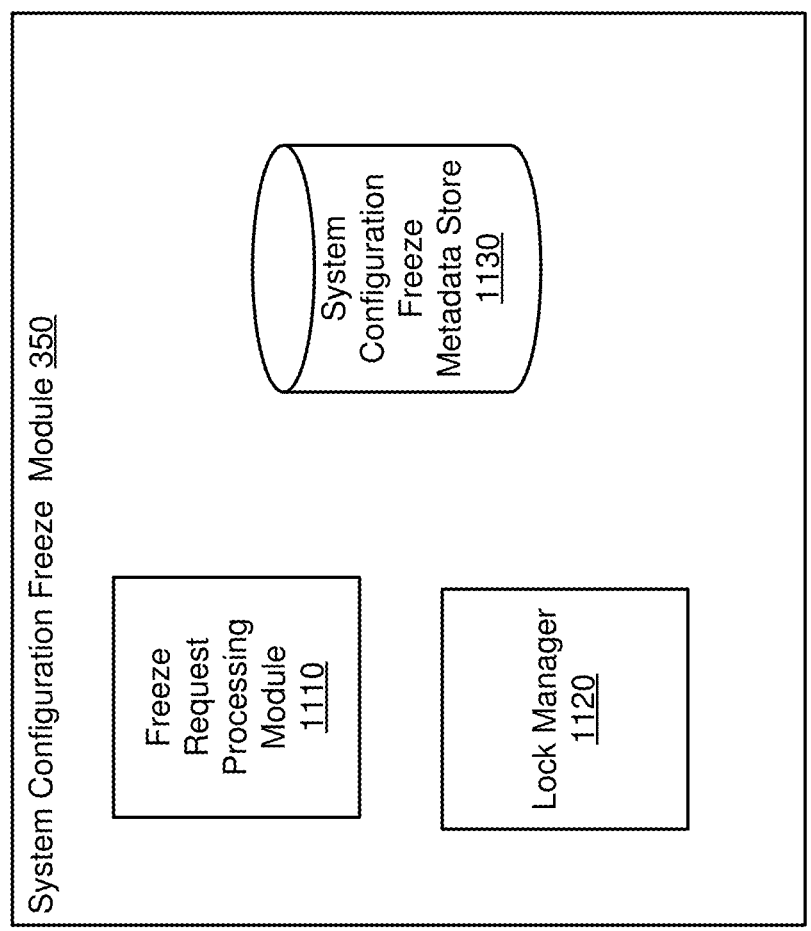
FIG. 11 shows the system architecture of a system configuration freeze module according to an embodiment.

FIG. 11 shows the system architecture of a system configuration freeze module according to an embodiment. The system configuration freeze module 350 includes a freeze request processing module 1110, a lock manager 1120, and a system configuration freeze metadata store 1130. Other embodiments may include more or fewer components than those indicated herein in FIG. 11.

The freeze request processing module 1110 receives system configuration freeze requests and processes them. The system configuration freeze request may be received from a client device of a user, for example, a system administrator. The system configuration freeze request specifies a time interval during which the system configuration freeze needs to be enforced. The system configuration freeze request may identify one or more services that need to be frozen during the specified time interval. The system configuration freeze request may specify a datacenter entity of a datacenter for performing the system configuration freeze. Accordingly, the request specifies that all services running in the datacenter entity need to be frozen during the specified time interval so that no modifications are performed to the software artifacts associated with these services and no modifications are performed to any type of configuration of these services. The freeze request processing module 1110 identifies a list of services that need to be frozen during the specified time interval. For example, if the system configuration freeze request specifies a datacenter entity, the freeze request processing module 1110 identifies all the services that are configured to run in the datacenter entity.

The system configuration freeze metadata store 1130 stores metadata relevant to performing service configuration freezes including metadata describing requests for system configuration freeze. The metadata describing a request includes a request identifier, a time period during which the system freeze request needs to be enforced and a datacenter entity for which the system configuration freeze needs to be performed. A time interval may be specified using a start time and an end time or by using a start time and a length of the time interval. The system configuration freeze metadata store 1130 also stores a mapping from services to locks that may be acquired by either the system configuration freeze module 350 for enforcing a freeze on a service or by a pipeline for making a modification to the service configuration. The metadata describing a lock includes an estimate of the length of time period for which the lock is requested.

The lock manager 1120 receives requests for acquiring locks and acquires the requested lock. The lock manager receives the request for acquiring a lock from the freeze request processing module 1110 or from a pipeline execution module. In an embodiment the lock manager is a distributed locking service that may run on a system distinct from the computing system running the freeze request processing module 1110. The lock manager 1120 also receives requests for releasing a lock that was previously acquired and release the lock. Acquiring the lock associated with a service for a particular time period ensures that no pipeline configure to modify the service is able to proceed during that time period. Releasing the lock after that time interval allows any pipelines attempting to modify the configuration of the service to proceed, thereby ending the system configuration freeze for the service.

The pipeline generator module 320 generates pipelines for making changes to system configuration of datacenter entities. The generated pipelines are configured to allow the system configuration freeze module 350 to freeze configurations of any service.

Figure 12:
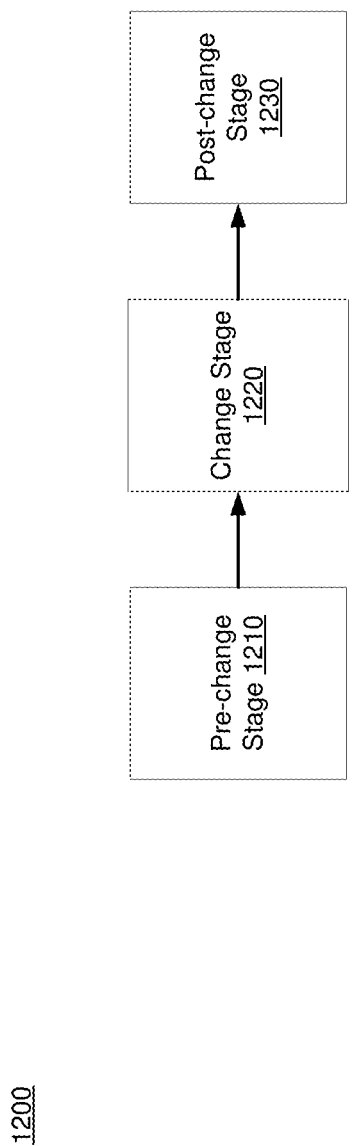
FIG. 12 shows an example pipeline for enforcing system configuration freeze according to an embodiment.

FIG. 12 shows an example pipeline for enforcing system configuration freeze according to an embodiment. FIG. 12 shows some of the stages of a pipeline generated for modifying a service configuration of a service, for example, for modifying a software artifact associated with a service. The generated pipeline may include other stages not shown in FIG. 12. The pipeline shown in FIG. 12 may be a portion of the service pipeline 1030 illustrated in FIG. 10.

Accordingly, the generated pipeline 1200 includes a pre-change stage 1210, a change stage 1220, and a post-change stage 1230. The change stage 1220 includes the various types of system configuration changes that may be implemented by the software release management module 230. These system configuration changes include but are not limited to deploying a new service in the datacenter entity, destroying a service in the datacenter entity, provisioning a resource in the datacenter entity, destroying a resource in the datacenter entity, performing any utility operation, or performing a rollback of a service deployment by reverting to an earlier version of the service or a software artifact. The system configuration freeze module 350 is configured to freeze all these type of changes to a datacenter entity during a time interval.

The pre-change stage 1210 includes instructions for acquiring a lock associated with the service. The post-change stage 1230 includes instructions for releasing the lock acquired in the pre-change stage 1210. In an embodiment, information identifying a lock associated with each service is stored in the system configuration freeze metadata store 1130. Accordingly, the pipeline generator module 320 may access the lock associated with the pipeline and generate instructions for acquiring the lock and include the generated instructions in the pre-change pipeline. Alternatively, the pipeline generator module 320 may generate instructions for accessing the system configuration freeze metadata store 1130 to acquire the identifier for the lock associated with the service and then acquire the lock. The instructions for acquiring the lock in the pre-change stage 1210 cause the pipeline execution to get suspended if the lock cannot be acquired, for example, if the lock has previously been acquired by another entity and not yet released. For example, the system configuration freeze module 350 acquires locks for all services that need to be frozen during a time interval, thereby suspending execution of any pipeline attempting to change the system configuration for the service during the time interval. In an embodiment, the pre-change stage 1210 instructions cause the execution of the pipeline 1200 to fail if the lock associated with the service cannot be acquired. In an embodiment, the pre-change stage 1210 instructions cause the execution of the pipeline 1200 to fail if the lock associated with the service cannot be acquired within a threshold time period. Accordingly, the execution of the pipeline times out and fails after a period of time. If the execution of the pipeline fails, the subsequent stages, for example, the change stage 1220 and the post change stage 1230 are not executed.

Process of System Configuration Freeze

Figure 13:
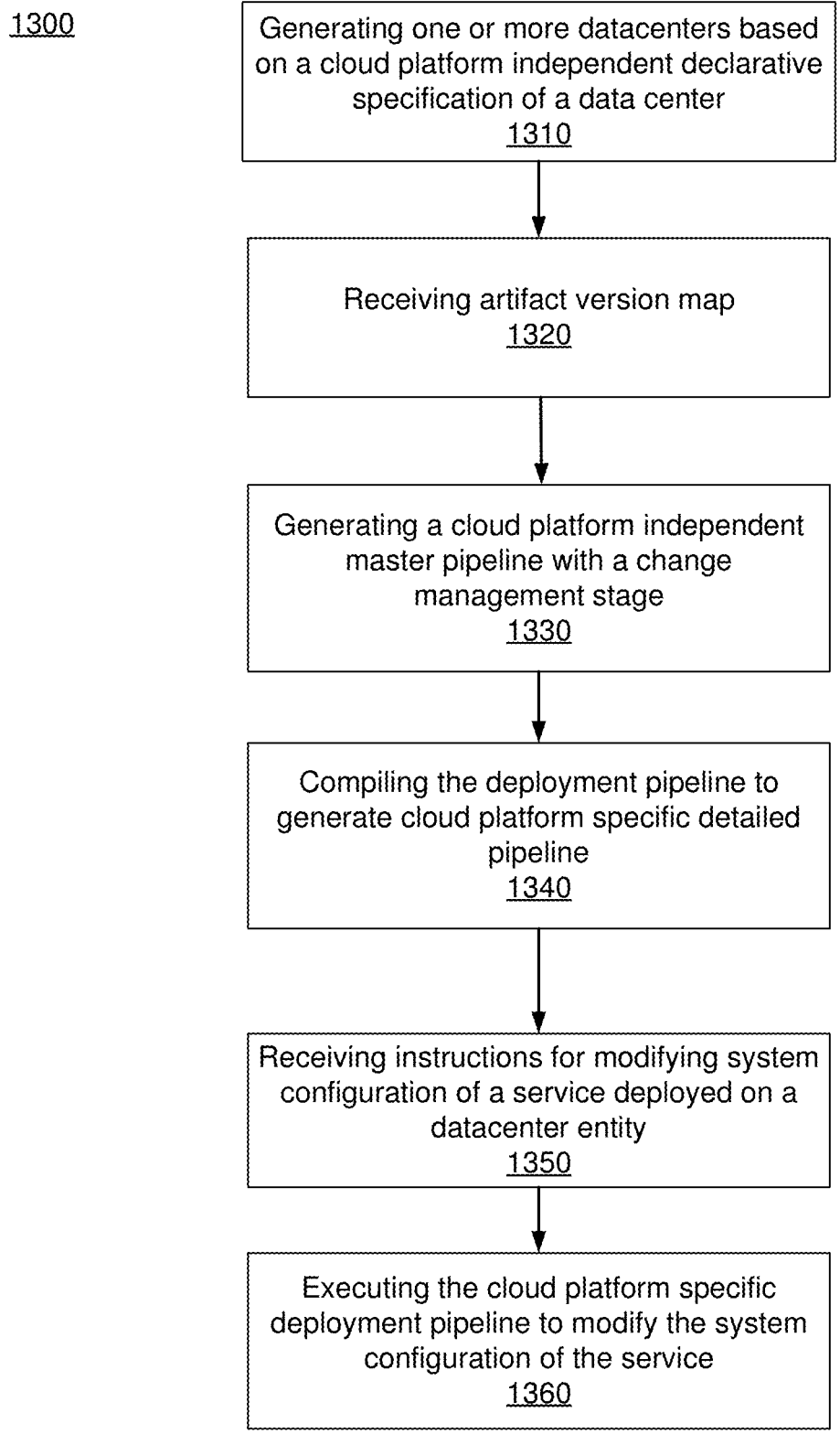
FIG. 13 shows the process for making changes to system configurations of services deployed on a datacenter in a cloud platform according to an embodiment.

FIG. 13 shows the process for making changes to system configurations of services deployed on a datacenter in a cloud platform according to an embodiment. The datacenter generation module 220 generates 1310 one or more datacenters based on a cloud platform independent declarative specification, for example, as shown in the processes illustrated in FIGS. 6 and 7. Each datacenter has a set of services deployed in the datacenter. The software release management module 230 receives 1320 an artifact version map that includes information describing any changes that need to be made to the services installed and executing in a datacenter. For example, the changes may comprise adding new services to the datacenter, removing services currently deployed in a datacenter, changing configuration of a service, deploying a new version of a software artifact for a service, and so on.

The software release management module 230 generates 1330 a cloud platform independent master pipeline that includes a change management stage, for example, the master pipeline as illustrated in FIG. 12. The software release management module 230 compiles 1340 the cloud platform independent master pipeline to generate a cloud platform specific detailed pipeline that includes instructions for deploying services according to the artifact version map on a datacenter deployed on a target cloud platform.

The software release management module 230 receives 1350 instructions for modifying the system configuration of a service deployed on a datacenter entity. The software release management module 230 executes 1360 the cloud platform specific detailed pipelines to make the appropriate modifications to the system configuration of the service according to the artifact version map. The cloud platform specific detailed pipeline comprises a change stage comprising instructions for making a change associated with one or more software artifacts for the datacenter entity, a pre-change stage comprising instructions for acquiring a lock, and a post-change stage for releasing the lock after the change is made. The pipeline execution is suspended if the pre-change stage fails to acquire the lock.

Figure 14:
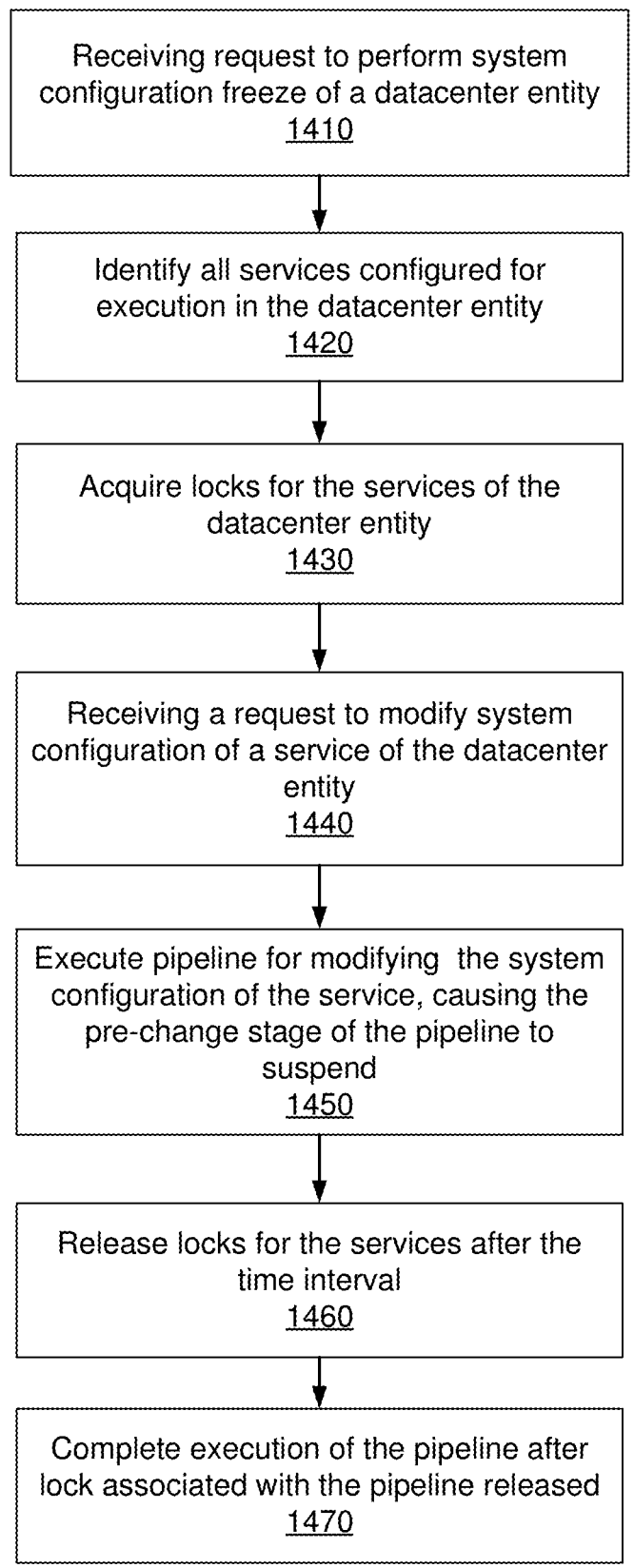
FIG. 14 shows the overall process for performing system configuration freeze of datacenter entities of datacenters configured on a cloud platform according to an embodiment.

FIG. 14 shows the overall process for performing system configuration freeze of datacenter entities of datacenters configured on a cloud platform according to an embodiment. The system configuration freeze module 350 receives 1410 a request to perform system configuration freeze for a datacenter entity for a time interval. The system configuration freeze module 350 identifies all services configured for execution within the datacenter entity. The system configuration freeze module 350 may identify the services based on the declarative specification of the datacenter to which the datacenter entity belongs. The request to perform system configuration freeze specifies a time interval during which the system configuration freeze is requested to be enforced.

The system configuration freeze module 350 acquires 1430 locks associated with services of the datacenter entity for the time interval. In an embodiment, the system configuration freeze module 350 accesses the system configuration freeze metadata store 1130 to determine the identifiers for the locks corresponding to each service identified 1420 and acquires locks corresponding to the lock identifiers once the time interval for the system configuration freeze starts.

After the start of the time interval and before the time interval ends, the software release management module 230 receives 1440 a request to modify system configuration of a service running on the datacenter during the time interval. The software release management module 230 executes 1450 a pipeline for deploying software artifacts associated with the service running on the datacenter entity. The execution of the pipeline causes execution of the pre-change stage of the pipeline, thereby causing the pipeline execution to suspend until the lock is acquired. After the time interval is completed, the system configuration freeze module 350 releases 1460 the locks acquired for the services running on the datacenter entity. As a result, the pre-change stage of the pipeline is able to acquire the lock and cause the pipeline execution to complete 1470, thereby permitting the requested change to the service to be performed after the time interval. According to some embodiments, the post-change stage releases the lock acquired for the service after the change stage is complete and the requested modification to the system configuration is made. This process ensures that any pipeline attempting to modify a service running on the datacenter entity is prevented from making the modification during the time interval.

According to some embodiments, the pre-change stage includes instructions that determine whether the pre-change stage of the pipeline failed to acquire the lock for more than a threshold time. If the pre-change stage of the pipeline fails to acquire the lock for more than a threshold time, the execution of the pipeline is failed. Accordingly, the user is provided with an indication that the pipeline execution failed and the user has to send a subsequent instruction to make the system configuration modification to the service.

In an embodiment, if a pipeline is currently executing that is modifying the system configuration of a service of a datacenter entity when a system configuration freeze of the datacenter entity is requested, the system postpones the system configuration freeze and accordingly delays the interval during which the system configuration freeze occurs until the current pipeline execution is completed. However, the system prevents any new pipeline executions that may change system configurations for services of the datacenter entity from starting until the system configuration freeze is completed. This happens since the pipeline currently executing has the lock associated with the service, thereby causing the system configuration freeze request to be put on hold as the system configuration freeze module 350 attempts to acquire locks on services of the datacenter entity. A system administrator can manually destroy a pipeline that is currently running in order to allow the system configuration freeze to proceed.

In an embodiment, if a failure that occurs during execution of a pipeline when the system configuration freeze was enforced for a datacenter entity, the pipeline execution may cause a lock to be acquired but not released. The lock manager 1120 performs a lock garbage collection process that checks if any locks remaining unreleased after the time interval of the system configuration freeze. If the lock manager 1120 identifies any locks associated with services of the datacenter entity after the time interval, the lock manager 1120 releases these locks.

In some embodiments, a lock is associated with a time duration representing an estimate of the length of time for which the lock is expected to be acquired. The system may use the time duration of locks as an estimate of how long the pipeline execution takes. The system may prioritize certain pipeline execution based on their expected duration, for example, a shorter pipeline may be prioritized over pipelines that take significantly longer. However, if the pipeline execution takes longer than the time duration specified for the lock, the system simply notes the discrepancy. The system maintains a list of services for which the specified lock duration is significantly lower than the actual time duration for which the lock is acquired. The system prioritizes these pipelines different from other pipelines that have accurate durations specified for the locks. In an embodiment, the system automatically determines the lock durations based on past execution times of pipelines.

In some embodiments, a system configuration freeze is associated with a priority. The requests for modification of services are also associated with priority measures. If during the system configuration freeze interval, the software release management module 230 receives a request for modification of a service such that the priority of the request for modification of the service is higher than the priority of the system configuration freeze, the request for modification of the service of the datacenter entity is allowed to proceed during the time interval, in spite of the system configuration freeze. The system provides this mechanism so that if there are some urgent fixes required for issues that may occur during system configuration freezes such as a moratorium, the fixes are allowed to proceed.

Computer Architecture

Figure 15:
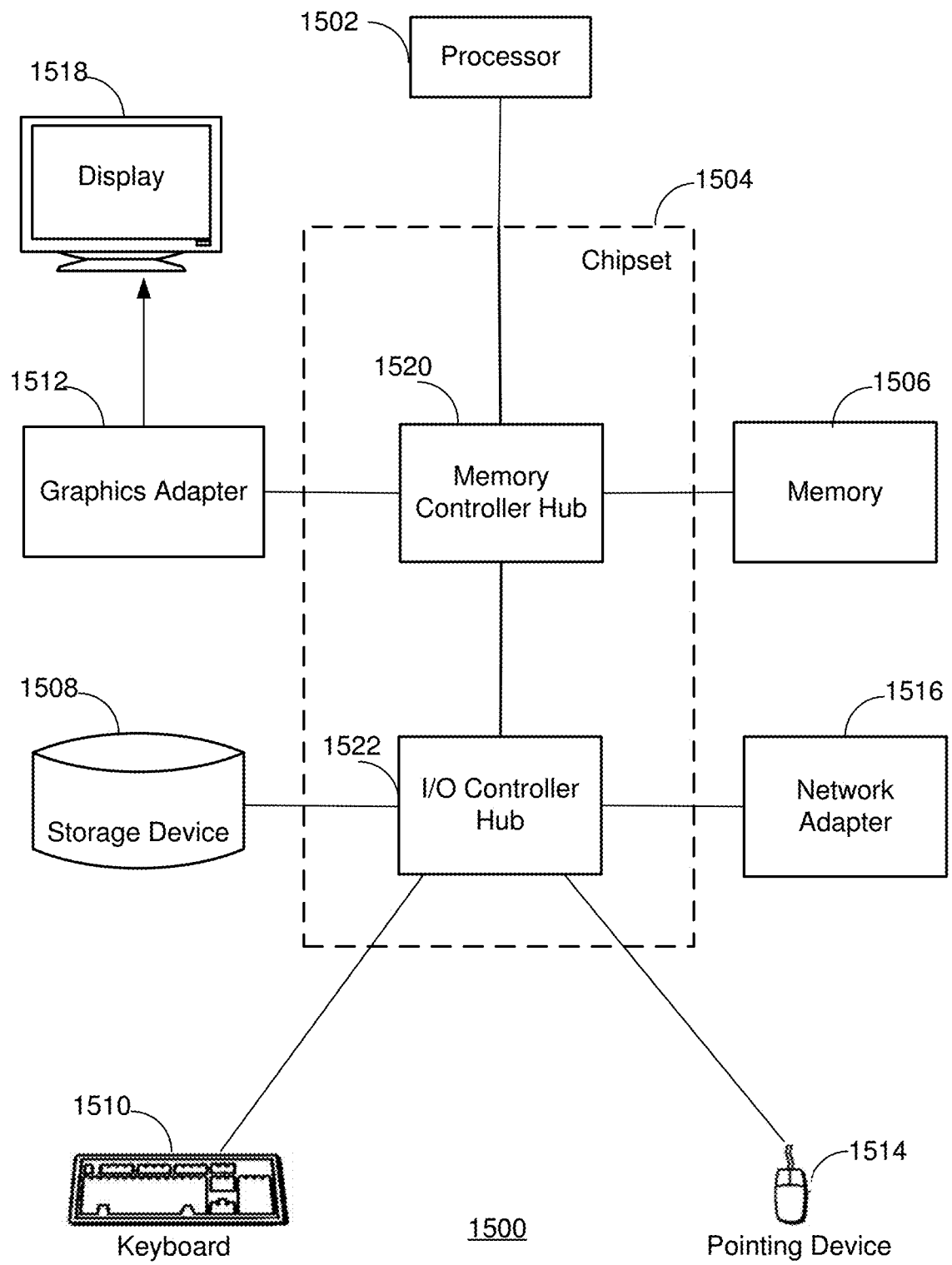
FIG. 15 is a block diagram illustrating a functional view of a typical computer system for use in the environment of FIG. 1 according to one embodiment.

FIG. 15 is a high-level block diagram illustrating a functional view of a typical computer system for use as one of the entities illustrated in the environment 100 of FIG. 1 according to an embodiment. Illustrated are at least one processor 1502 coupled to a chipset 1504. Also coupled to the chipset 1504 are a memory 1506, a storage device 1508, a keyboard 1510, a graphics adapter 1512, a pointing device 1514, and a network adapter 1516. A display 1518 is coupled to the graphics adapter 1512. In one embodiment, the functionality of the chipset 1504 is provided by a memory controller hub 1520 and an I/O controller hub 1522. In another embodiment, the memory 1506 is coupled directly to the processor 1502 instead of the chipset 1504.

The storage device 1508 is a non-transitory computer-readable storage medium, such as a hard drive, compact disk read-only memory (CD-ROM), DVD, or a solid-state memory device. The memory 1506 holds instructions and data used by the processor 1502. The pointing device 1514 may be a mouse, track ball, or other type of pointing device, and is used in combination with the keyboard 1510 to input data into the computer system 200. The graphics adapter 1512 displays images and other information on the display 1518. The network adapter 1516 couples the computer system 1500 to a network.

As is known in the art, a computer 1500 can have different and/or other components than those shown in FIG. 15. In addition, the computer 1500 can lack certain illustrated components. For example, a computer system 1500 acting as a multi-tenant system 110 may lack a keyboard 1510 and a pointing device 1514. Moreover, the storage device 1508 can be local and/or remote from the computer 1500 (such as embodied within a storage area network (SAN)).

The computer 1500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1508, loaded into the memory 1506, and executed by the processor 1502.

The types of computer systems 1500 used by the entities of a system environment can vary depending upon the embodiment and the processing power used by the entity. For example, a client device may be a mobile phone with limited processing power, a small display 1518, and may lack a pointing device 1514. A multi-tenant system or a cloud platform, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer implemented method for enforcing system configuration freeze on services deployed in cloud platforms, the method comprising:
    accessing a datacenter configured on a target cloud platform, the datacenter executing a set of services, the datacenter comprising a hierarchy of data center entities, wherein each data center entity comprises (1) one or more services or (2) one or more other data center entities;
    generating a pipeline for deploying services on a datacenter entity, the pipeline comprising:

a change stage comprising instructions for making a change associated with one or more software artifacts for the datacenter entity; and a pre-change stage comprising instructions for acquiring a lock, wherein the pipeline execution is suspended responsive to the pre-change stage failing to acquire the lock;

receiving a request to perform system configuration freeze for the datacenter entity for a time interval;

acquiring one or more locks associated with services of the datacenter entity for the time interval; and executing the pipeline for deploying software artifacts associated with a service on the datacenter entity during the time interval, comprising:

executing the pre-change stage of the pipeline causing the pipeline execution to suspend until the lock is acquired.

2. The computer implemented method of claim 1, further comprising:

acquiring the lock by the pipeline after the time interval; and executing the change stage for making the change associated with one or more software artifacts for the datacenter entity.

3. The computer implemented method of claim 1, further comprising:

determining that the pre-change stage of the pipeline failed to acquire the lock for more than a threshold time; and responsive to determining that the pre-change stage of the pipeline failed to acquire the lock for more than a threshold time, failing execution of the pipeline.

4. The computer implemented method of claim 1, wherein the pipeline further comprises a post-change stage comprising instructions for releasing the lock associated with the datacenter entity, wherein executing the pipeline comprises:

releasing the lock after completing execution of the change stage for making the change associated with the one or more software artifacts for the datacenter entity.

5. The computer implemented method of claim 1, wherein the system configuration freeze is associated with a priority, the method further comprising:

receiving a request for modification of a service of the datacenter entity during the time interval of the system configuration freeze, the request having higher priority than the priority of the system configuration freeze; and permitting the modification of the service to proceed during the time interval, in spite of the system configuration freeze.

6. The computer implemented method of claim 1, wherein the system configuration freeze is performed responsive to determining that greater than a threshold amount of workload is expected during the time interval.

7. The computer implemented method of claim 1, wherein the system configuration freeze is performed responsive to determining that an issue associated with the datacenter entity is being diagnosed during the time interval.

8. The computer implemented method of claim 1, wherein the system configuration freeze is performed responsive to determining that a particular system configuration change is being performed during the time interval, the system configuration freeze preventing any other system configuration change during the time interval.

9. The computer implemented method of claim 1, after the time interval, performing steps comprising:

identifying one or more locks that failed to release by any pipeline; and releasing the identified locks.

10. The computer implemented method of claim 1, further comprising:

responsive to receiving a request for system configuration freeze, receiving a request for update to a software artifact for the datacenter entity; and responsive to determining that the expected time to execute the request to update the software artifact is below a threshold, delaying execution of the request for system configuration freeze until the execution of the request for update to the software artifact of the datacenter entity is completed.

11. The computer implemented method of claim 1, wherein the lock is associated with a length of time interval for which the lock is requested, the method further comprising:

monitoring whether the lock is released before the specified length of time interval; and responsive to determining that the lock is not released before the specified length of time interval, sending an alert message.

12. The computer implemented method of claim 11, wherein the lock is associated with a length of time interval for which the lock is requested, the method further comprising:

determining the length of time interval for acquiring locks based on past executions of pipelines.

13. The computer implemented method of claim 1, wherein the datacenter configured on the cloud platform is associated with a tenant of a multi-tenant system, wherein the request for system configuration freeze is requested from a client device associated with the tenant.

14. The computer implemented method of claim 13, further comprising:

receiving, a cloud platform independent declarative specification of a data center for a tenant of the multi-tenant system, the data center representing a set of computing resources used by a set of users associated with the tenant, the cloud platform independent declarative specification configured to generate the data center on any of a plurality of cloud platforms and specified using a cloud platform infrastructure language.

15. The computer implemented method of claim 14, further comprising:

compiling the cloud platform independent declarative specification to generate a cloud platform specific data center representation for creating the data center on the target cloud platform; and sending the cloud platform specific data center representation and a set of instructions for execution on the target cloud platform, wherein the target cloud platform executes the instructions to configure the data center using the cloud platform specific data center representation.

16. A non-transitory computer readable storage medium for storing instructions that when executed by a computer processor cause the computer processor to perform steps for configuring data centers in a cloud platform, the steps comprising:

accessing a datacenter configured on a target cloud platform, the datacenter executing a set of services, the datacenter comprising a hierarchy of data center entities, wherein each data center entity comprises (1) one or more services or (2) one or more other data center entities;

generating a pipeline for deploying services on a datacenter entity, the pipeline comprising:

a change stage comprising instructions for making a change associated with one or more software artifacts for the datacenter entity; and a pre-change stage comprising instructions for acquiring a lock, wherein the pipeline execution is suspended responsive to the pre-change stage failing to acquire the lock;

receiving a request to perform system configuration freeze for the datacenter entity for a time interval;

acquiring one or more locks associated with services of the datacenter entity for the time interval; and executing the pipeline for deploying software artifacts associated with a service on the datacenter entity during the time interval, comprising:

executing the pre-change stage of the pipeline causing the pipeline execution to suspend until the lock is acquired.

17. The non-transitory computer readable storage medium of claim 16, wherein the instructions further cause the computer processor to perform steps comprising:

acquiring the lock by the pipeline after the time interval; and executing the change stage for making the change associated with one or more software artifacts for the datacenter entity.

18. The non-transitory computer readable storage medium of claim 16, wherein the system configuration freeze is associated with a priority, wherein the instructions further cause the computer processor to perform steps comprising:

receiving a task for execution, the task having higher priority than the priority of the system configuration freeze, the higher priority task causing a change to a software artifact of the datacenter entity during the time interval; and permitting the higher priority task to execute during the time interval, in spite of the system configuration freeze.

19. The non-transitory computer readable storage medium of claim 16, wherein the instructions further cause the computer processor to perform steps comprising:

responsive to receiving a request for system configuration freeze, receiving a request for update to a software artifact for the datacenter entity; and responsive to determining that the expected time to execute the request to update the software artifact is below a threshold, delaying execution of the request for system configuration freeze until the execution of the request for update to the software artifact of the datacenter entity is completed.

20. A computer system comprising:

a computer processor; and a non-transitory computer readable storage medium for storing instructions that when executed by the computer processor, cause the computer processor to perform steps for configuring data centers in a cloud platform, the steps comprising;

accessing a datacenter configured on a target cloud platform, the datacenter executing a set of services, the datacenter comprising a hierarchy of data center entities, wherein each data center entity comprises (1) one or more services or (2) one or more other data center entities;

generating a pipeline for deploying services on a datacenter entity, the pipeline comprising:

a change stage comprising instructions for making a change associated with one or more software artifacts for the datacenter entity; and a pre-change stage comprising instructions for acquiring a lock, wherein the pipeline execution is suspended responsive to the pre-change stage failing to acquire the lock;

receiving a request to perform system configuration freeze for the datacenter entity for a time interval;

acquiring one or more locks associated with services of the datacenter entity for the time interval; and executing the pipeline for deploying software artifacts associated with a service on the datacenter entity during the time interval, comprising:

executing the pre-change stage of the pipeline causing the pipeline execution to suspend until the lock is acquired.

* * * * *

UNITED STATES PATENT AND TRADEMARK OFFICE
CERTIFICATE OF CORRECTION

| | | |
|---|---|---|
| PATENT NO. | : 11,403,145 B1 | Page 1 of 1 |
| APPLICATION NO. | : 17/147715 | |
| DATED | : August 2, 2022 | |
| INVENTOR(S) | : Jeaneth Vergara | |

It is certified that error appears in the above-identified patent and that said Letters Patent is hereby corrected as shown below:

On the Title Page

Below Item (22), insert Item (65) -- Prior Publication Data US 2022/0222125 A1 Jul. 14, 2022 --.

Item (10), in Column 2, in "Patent No.", Line 1, delete "B1" and insert -- B2 --, therefor.

In the Claims

In Column 36, in Claim 20, Line 15, delete "comprising;" and insert -- comprising: --, therefor.

Signed and Sealed this
Twenty-ninth Day of November, 2022

Katherine Kelly Vidal
*Director of the United States Patent and Trademark Office*